Feb. 8, 1966  E. B. FERNBERG  3,233,503
FASTENERS
Filed June 4, 1963
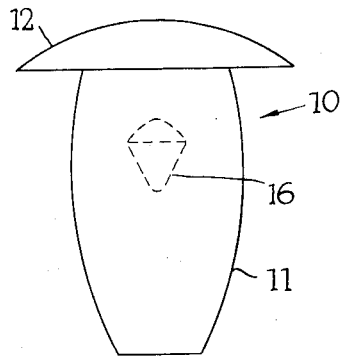
FIG.1
FIG.3
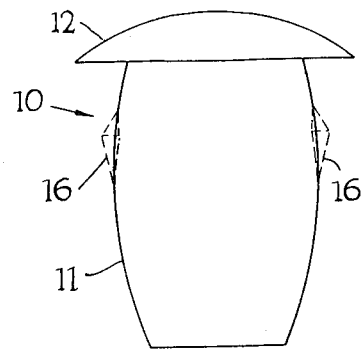
FIG.2
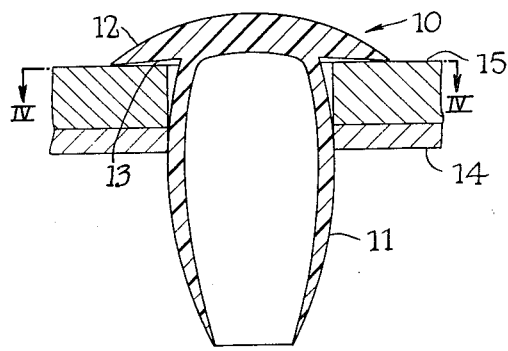
FIG.4  FIG.5
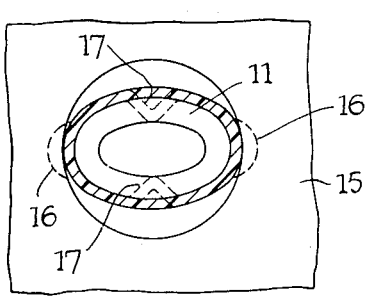
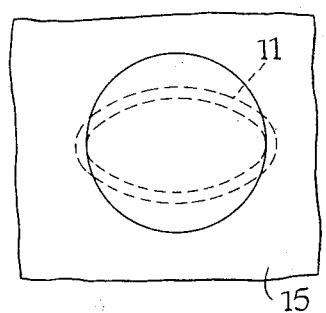
Inventor.
Eric B. Fernberg,
by Walter L. Jones,
Attorney.

United States Patent Office 3,233,503
Patented Feb. 8, 1966

3,233,503
FASTENERS
Eric Birger Fernberg, Wavendon, near Bletchley, England, assignor to United-Carr Incorporated, Boston, Mass., a corporation of Delaware
Filed June 4, 1963, Ser. No. 285,487
Claims priority, application Great Britain, June 5, 1962, 21,744/62
2 Claims. (Cl. 85—80)

The present invention relates to an improved fastener which is suitable for securing two apertured members together or closing an aperture in a support.

According to the invention there is provided a fastener for insertion in a substantially circular aperture in a support, comprising a tubular shank and an enlarged head, wherein the shank is substantially non-circular in transverse cross section at least in the region adjacent the head.

A preferred form of the invention will now be described with reference to the accompanying diagrammatic drawings, in which:

FIGURES 1 and 2 are respectively a front and side elevation of a fastener,

FIGURE 3 is a sectional elevation showing the fastener of FIGURES 1 and 2 securing a trim pad to a panel, FIGURE 4 is a section on the line IV–IV of FIGURE 3, with the entire assembly having been rotated 90°, and FIGURE 5 is a view similar to FIGURE 4 but showing the dimensions of the fastener when unstressed in broken lines.

In FIGURES 1 to 3 a resilient fastener is indicated generally at 10.

The fastener 10 is formed from any suitable mouldable material, such as a synthetic resin, and comprises a shank 11 and enlarged head 12.

The head 12 is in the shape of a segment of a sphere and has a dished underface 13.

The shank 11 is tubular and oval in transverse cross section over its entire length. The shank 11 is also barrel shaped and open-ended.

The fastener 10 may be used, as shown in FIGURE 3 to attach a trim pad 14 to a panel 15 which forms a part of a vehicle body.

The trim pad 14 and panel 15 are each formed with a plurality of suitably positioned circular apertures and to make the assembly the trim pad is brought up to the panel and adjusted so that the apertures in the trim pad are approximately co-axial with the apertures in the panel. A fastener 10 is then forced through each pair of aligned apertures.

The fastener 10 may be inserted through the apertures in the same way as a conventional nail merely by striking the head 12 with a hammer, the tapered open end providing a good lead in and ensuring that the fastener does not cant easily when struck.

As will be seen from FIGURE 5 the shape of the shank 11 in the region immediately adjacent the head 12 is such that it is compressed by the aperture from its unstressed oval shape towards a circular shape. Thus when assembled through the aperture in the panel the shank of the fastener is permanently compressed and makes a secure friction fit in the aperture.

The fastener 10 may be modified by providing a shank which is oval in cross-section in the region adjacent the head and circular in cross-section over the rest of its length. The tip of the shank, which is circular, is then easily inserted into a circular aperture while a tight friction fit is obtained between the shank and the aperture when the fastener is forced fully home and the region of oval cross-section is compressed within the circular aperture.

Alternatively or in addition, the shank of the fastener 10 may be provided with a circumferential discontinuity intermediate its length in the form of a transverse or sloping shoulder which will engage the undersurface or the panel or member through which the fastener is inserted. The discontinuity or shoulder may be continuous, extending around the whole of the shank or it may be formed at each end of the shank as shown in broken lines at 16.

In order to increase the resilience of the shank and reduce its resistance to distortion when it is inserted in the aperture a longitudinally extending form 17 may be provided in each side of the shank, as shown in broken lines in FIGURE 4.

The shank of the fastener 10 may also be provided with a longitudinal slit or slits running out of the free end to facilitate the withdrawal of a mould during the manufacturing process.

The fastener of the present invention may be used to secure two apertured members together in the manner described above or it may be used as a closure device to seal an aperture in a panel.

The head of the fastener of the present invention may also be modified; for example it may be rectangular or oval in plan view. Alternatively, or in addition it may be adapted to secure a member such as a cable or a beading to an apertured panel in place of the trim pad 14 shown in FIGURE 3.

What I claim is:

1. A unitary, molded, resilient fastening device adapted for frictionally engaging the internal walls defining axially aligned, circular apertures of a plurality of overlapping panels comprising an enlarged, imperforate head section, an elongated, continuous, tubular shank extending from said head section to an open end termination remote from said head, said shank being oval in transverse cross-section, having at least one inwardly extending longitudinal fold at its minor diametrical portions and defining a curved outline which increases in transverse dimension from the head to an intermediate point and decreases in transverse dimension from the intermediate point to the open end, the side wall of said shank having a generally uniform thickness over the major portion of its length and a decreasing thickness at the end remote from said head section.

2. A fastening device according to claim 1 wherein said shank has a peripherally-disposed shoulder nearer said head section than said open end for engaging a surface of a panel to be secured.

References Cited by the Examiner

UNITED STATES PATENTS

| 2,438,499 | 3/1948 | Hartman | 85—5 |
|-----------|--------|---------|------|
| 2,537,786 | 1/1951 | Poupitch | 85—5 |
| 2,780,128 | 2/1957 | Rapata | 85—5 |
| 2,909,957 | 10/1959 | Rapata | 85—5 |
| 3,029,486 | 4/1962 | Raymond. | |
| 3,033,624 | 5/1962 | Biesecker | 85—82 |

FOREIGN PATENTS

| 962,483 | 4/1957 | Germany. |
|---------|--------|----------|
| 490,718 | 8/1938 | Great Britain. |

EDWARD C. ALLEN, *Primary Examiner.*

UNITED STATES PATENT OFFICE
CERTIFICATE OF CORRECTION

Patent No. 3,233,503            February 8, 1966

Eric Birger Fernberg

It is hereby certified that error appears in the above numbered patent requiring correction and that the said Letters Patent should read as corrected below.

Column 2, line 15, for "form" read -- fold --.

Signed and sealed this 10th day of January 1967.

(SEAL)
Attest:

ERNEST W. SWIDER            EDWARD J. BRENNER
Attesting Officer            Commissioner of Patents